United States Patent
Houck (10) Patent No.: US 11,530,951 B2
(45) Date of Patent: Dec. 20, 2022

(54) OPTICAL SENSOR DEVICE

(71) Applicant: VIAVI Solutions Inc., San Jose, CA (US)

(72) Inventor: William D. Houck, Santa Rosa, CA (US)

(73) Assignee: VIAVI Solutions Inc., San Jose, CA (US)

( * ) Notice: Subject to any disclaimer, the term of this patent is extended or adjusted under 35 U.S.C. 154(b) by 42 days.

(21) Appl. No.: 17/139,504

(22) Filed: Dec. 31, 2020

(65) Prior Publication Data

US 2021/0239529 A1 Aug. 5, 2021

Related U.S. Application Data

(60) Provisional application No. 62/969,578, filed on Feb. 3, 2020.

(51) Int. Cl.

| | |
|---|---|
| *G01J 3/28* | (2006.01) |
| *G01J 3/02* | (2006.01) |
| *H04N 5/335* | (2011.01) |
| *H04N 5/225* | (2006.01) |
| *H04N 9/04* | (2006.01) |

(52) U.S. Cl.
CPC ........... *G01J 3/2823* (2013.01); *G01J 3/0229* (2013.01); *H04N 5/2253* (2013.01); *H04N 5/22541* (2018.08); *H04N 5/335* (2013.01); *H04N 9/0455* (2018.08)

(58) Field of Classification Search
CPC .... G01J 3/2823; G01J 3/0229; H04N 5/2253; H04N 5/22541; H04N 5/335; H04N 9/0455
See application file for complete search history.

(56) References Cited

U.S. PATENT DOCUMENTS

| | | | | |
|---|---|---|---|---|
| 2005/0243312 | A1* | 11/2005 | Geshwind | G01J 3/2846 356/330 |
| 2006/0274308 | A1* | 12/2006 | Brady | G01J 3/2803 356/326 |

(Continued)

OTHER PUBLICATIONS

Extended European Search Report for Application No. EP21154493.7, dated Jun. 9, 2021, 12 pages.

(Continued)

*Primary Examiner* — Dominic J Bologna (74) *Attorney, Agent, or Firm* — Harrity & Harrity, LLP (57) ABSTRACT

An optical sensor device may include an optical sensor that includes a set of sensor elements; an optical filter that includes one or more channels; a phase mask configured to distribute a plurality of light beams associated with a subject in an encoded pattern on an input surface of the optical filter; and one or more processors. The one or more processors may be configured to obtain, from the optical sensor, sensor data associated with the subject and may determine a distance of the subject from the optical sensor device. The one or more processors may select, based on the distance, a processing technique to process the sensor data, wherein the processing technique is an imaging processing technique or a spectroscopic processing technique. The one or more processors may process, using the selected processing technique, the sensor data to generate output data and may provide the output data.

20 Claims, 7 Drawing Sheets (56) References Cited

U.S. PATENT DOCUMENTS

| | | | |
|---|---|---|---|
| 2010/0066854 A1* | 3/2010 | Mather | G02B 27/58 |
| | | | 348/222.1 |
| 2013/0123015 A1* | 5/2013 | Jung | G01S 17/894 |
| | | | 463/37 |
| 2020/0074657 A1* | 3/2020 | Zhou | G06T 3/60 |

OTHER PUBLICATIONS

Vivek B., "Lensless Imaging: A Computational Renaissance," IEEE Signal Processing Magazine, Sep. 2016, vol. 33 (5), pp. 23-35.
Wagadarikar A., et al., "Single Disperser Design for Coded Aperture Snapshot Spectral Imaging," Applied Optics, Apr. 2008, vol. 47 (10), pp. B44-B51.
Kuo, et al.; "DiffuserCam: Diffuser-Based Lensless Cameras"; Imaging and Applied Optics 2017; OSA 2016; 3 pages.

* cited by examiner

OPTICAL SENSOR DEVICE

RELATED APPLICATIONS

This application claims priority to U.S. Provisional Patent Application No. 62/969,578, filed on Feb. 3, 2020, and entitled "OPTICAL SENSOR UTILIZING SPECTRAL FILTER," the content of which is incorporated by reference herein in its entirety.

BACKGROUND

An optical sensor device may be utilized to capture information concerning light. For example, the optical sensor device may capture information relating to a set of wavelengths associated with the light. The optical sensor device may include a set of sensor elements (e.g., optical sensors, spectral sensors, and/or image sensors) that capture the information. For example, an array of sensor elements may be utilized to capture information relating to multiple wavelengths. The sensor element array may be associated with an optical filter. The optical filter may include one or more channels that respectively pass particular wavelengths to sensor elements of the sensor element array.

SUMMARY

In some implementations, an optical sensor device includes an optical sensor including a set of sensor elements; an optical filter including one or more channels; a phase mask configured to distribute a plurality of light beams associated with a subject in an encoded pattern on an input surface of the optical filter; and one or more processors configured to: obtain, from the optical sensor, sensor data associated with the subject; determine a distance of the subject from the optical sensor device; select, based on the distance, a processing technique to process the sensor data, wherein the processing technique is an imaging processing technique or a spectroscopic processing technique; process, using the selected processing technique, the sensor data to generate output data; and perform one or more actions based on the output data.

In some implementations, a non-transitory computer-readable medium storing instructions includes one or more instructions that, when executed by one or more processors of an optical sensor device, cause the one or more processors to: obtain, from an optical sensor of the optical sensor device, sensor data associated with a plurality of light beams that were distributed in an encoded pattern on an input surface of an optical filter of the optical sensor device by a phase mask of the optical sensor device; determine a distance of a subject associated with the plurality of light beams from the optical sensor device; select, based on the distance, a processing technique, of a plurality of processing techniques, to process the sensor data; process, using the selected processing technique, the sensor data to generate output data; and provide the output data.

In some implementations, a method includes obtaining, by an optical sensor device and from an optical sensor of the optical sensor device, sensor data associated with a plurality of light beams that were distributed in an encoded pattern on an input surface of an optical filter of the optical sensor device by a phase mask of the optical sensor device; selecting, by the optical sensor device, a processing technique, of a plurality of processing techniques, to process the sensor data, wherein the processing technique is an imaging processing technique or a spectroscopic processing technique; processing, by the optical sensor device and using the selected processing technique, the sensor data to generate output data; and providing, by the optical sensor device, the output data.

DETAILED DESCRIPTION

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

A conventional optical sensor device may be used to determine spectral information related to a subject and/or to determine health-related measurements of the subject. For example, conventional optical sensor devices may capture light associated with a subject to determine health-related measurements or health parameters for the subject (e.g., a human body), such as heartbeat, blood pressure, or respiration rate, among other examples. Moreover, a conventional computational imaging device is a lens-less device that may be used to generate an image of a subject associated with light captured by the conventional computational imaging device. For example, the conventional computational imaging device may include a phase mask that distributes light associated with the subject across an optical sensor and may process pattern information associated with the light that is captured by the optical sensor to generate the image of the subject.

Consequently, a device (e.g., a handheld or portable device, a non-portable device, and/or the like) that is configured to selectively obtain an optical measurement associated with a subject or an image of the subject requires incorporation of a conventional optical sensor device and a conventional computational imaging device into the device. This increases a complexity associated with designing, assembling, and/or maintaining the device that includes the two different conventional devices. Moreover, a combined footprint of the two different conventional devices prevents the two different conventional devices from being incorporated into user devices, such as mobile phone devices, that require a smaller form factor.

Some implementations described herein provide an optical sensor device that comprises an optical sensor, an optical filter, a phase mask configured to distribute a plurality of light beams associated with a subject in an encoded pattern on an input surface of the optical filter, and one or more processors. The one or more processors may be configured to obtain, from the optical sensor, sensor data associated with the subject and may determine a distance of the subject from the optical sensor device. The one or more processors may select, based on the distance, a processing technique, from a plurality of processing techniques, to process the sensor data. The plurality of processing techniques may include an imaging processing technique (e.g., a computational imaging processing technique for generating an image of the subject) or a spectroscopic processing technique (e.g., to determine a classification of the subject, a material composition of the subject, a health-related measurement of the subject, and/or the like). The one or more processors may process, using the selected processing technique, the sensor data to generate output data and may provide the output data (e.g., for display on a screen of a user device).

In this way, the optical sensor device described herein is able to provide a same functionality of the conventional optical sensor device and the conventional computational imaging device, but with just one device as compared to two different devices. This reduces a complexity associated with designing, assembling, and/or maintaining a device (e.g., a handheld or portable device, a non-portable device, and/or the like) that incorporates the optical sensor device and that is configured to selectively provide an optical measurement of a subject or an image of the subject. Further, the optical sensor device, as a single device, has a smaller footprint than a combined footprint of the conventional optical sensor device and the conventional computational imaging device. This allows the optical device to be incorporated into user devices, such as mobile phone devices, that require a small form factor, which may not be possible for a package that combines the conventional optical sensor device and the conventional computational imaging device.

Figure 1A:
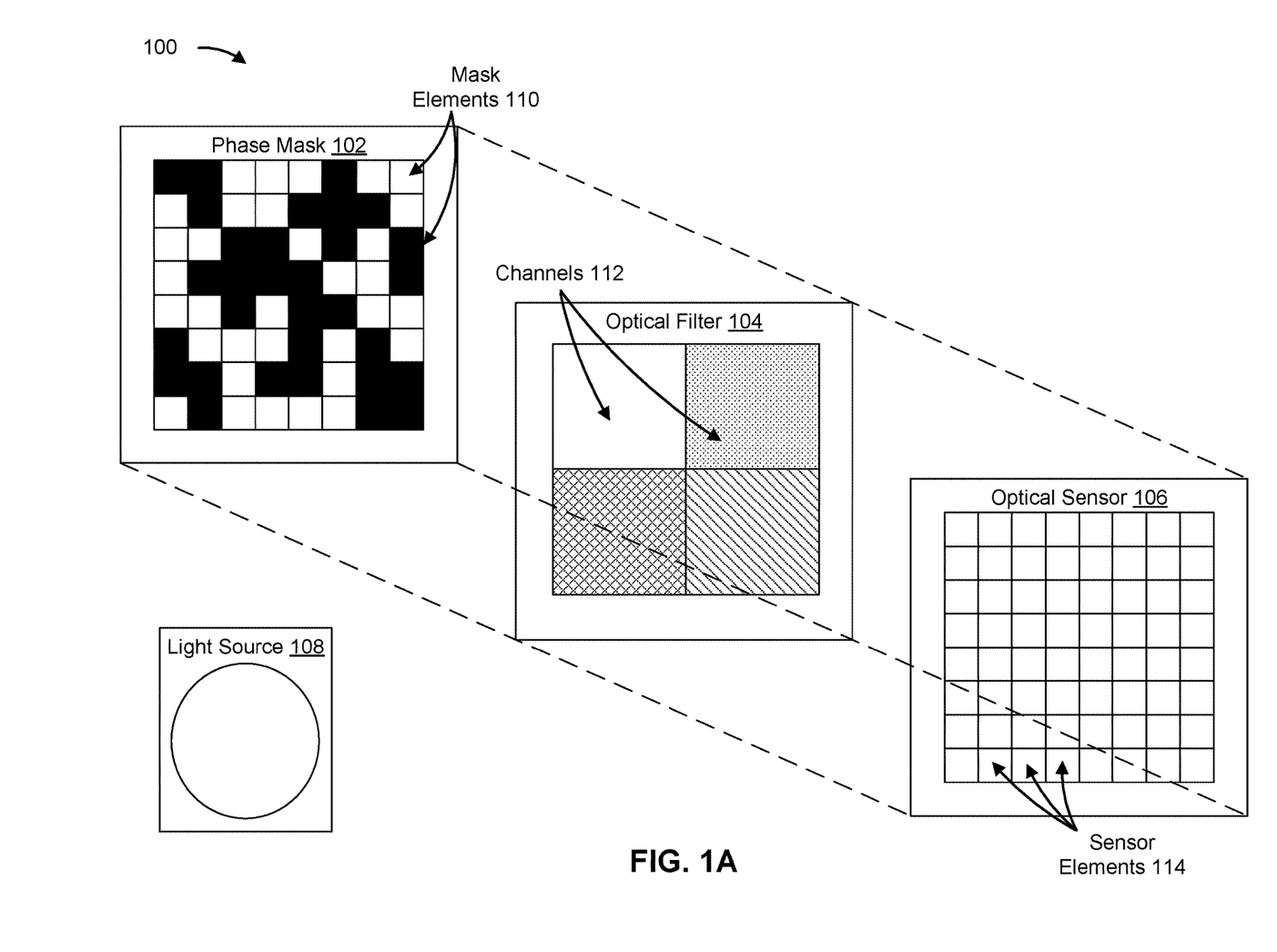
FIGS. 1A-1B are diagrams of an example implementation described herein.

FIGS. 1A-1B are diagrams of an overview of an example implementation 100 described herein. As shown in FIG. 1A, example implementation 100 includes a phase mask 102, an optical filter 104, an optical sensor 106, and/or a light source 108. The phase mask 102, the optical filter 104, the optical sensor 106, and/or the light source 108 may be associated with an optical sensor device, which is described in more detail elsewhere herein.

As further shown in FIG. 1A, the phase mask 102 may include one or more mask elements 110. The one or more mask elements 110 may each be transparent or opaque (e.g., reflective, absorbing, and/or the like) and arranged in a pattern (e.g., a non-uniform pattern). For example, as shown in FIG. 1A, transparent mask elements 110 are shown as white squares and opaque mask elements 110 are shown as black squares, and the transparent mask elements 110 and the opaque mask elements 110 are arranged in a grid pattern. In some implementations, the transparent mask elements 110 may respectively comprise one or more diffusive elements to diffuse light that passes through the phase mask 102 via the transparent mask elements 110. The phase mask 102 may be configured to distribute a plurality of light beams that pass through the phase mask 102 in an encoded pattern on an input surface of the optical filter 104. In some implementations, the phase mask 102 may be a coded aperture or another element that produces an encoded pattern of light beams, such as a Fresnel zone plate, an optimized random pattern array, a uniformly redundant array, a hexagonal uniformly redundant array, or a modified uniformly redundant array, among other examples.

The encoded pattern may indicate angular direction information associated with an origin plane (e.g., that is associated with a subject 116 described herein) of the plurality of light beams that are passed by the phase mask 102. In some implementations, the one or more mask elements 110 may be arranged in a pattern that is associated with an algorithm (e.g., a computational encoding algorithm) to cause the phase mask 102 to pass the plurality of light beams and to distribute the plurality of light beams in the encoded pattern on the input surface of the optical filter 104.

As further shown in FIG. 1A, the optical filter 104 may include one or more channels 112 that respectively pass light in different wavelength ranges to sensor elements 114 of the optical sensor 106. For example, as shown in FIG. 1A, a first channel 112 (e.g., indicated by no shading and no patterning) may pass light associated with a first wavelength range to a first set of sensor elements 114 (e.g., that comprises one or more sensor elements 114) of the optical sensor 106, a second channel 112 (e.g., indicated by gray shading) may pass light associated with a second wavelength range to a second set of sensor elements 114 of the optical sensor 106, a third channel 112 (e.g., indicated by diamond patterning) may pass light associated with a third wavelength range to a third set of sensor elements 114 of the optical sensor 106, and so on. In some implementations, the optical filter 104 may have an angle-dependent wavelength characteristic. For example, a channel 112 may be configured to have "angle shift," such that the channel 112 may pass light associated with a first wavelength range when the light falls incident on the channel 112 within a first incident angle range, may pass light associated with a second wavelength range when the light falls incident on the channel 112 within a second incident angle range, may pass light associated with a third wavelength range when the light falls incident on the channel 112 within a third incident angle range, and so on. The channel 112 may be configured to pass light associated with shorter wavelengths as the light falls on the channel 112 at greater incident angles.

In some implementations, the optical filter 104 may include an optical interference filter. The optical interference filter may have an angle dependent wavelength characteristic, and the angle dependent wavelength characteristic may be represented by an equation of the form:

$$\lambda_\theta = \lambda_0 \left[1 - \frac{n_0}{n_e}\sin^2\theta\right]^{1/2},$$

where $\lambda_\theta$ represents a peak wavelength at incident angle $\theta$, $\lambda_0$ represents a peak wavelength at incident angle 0, $n_0$ represents a refractive index of the incident medium, $n_e$ represents an effective index of the optical interference filter, and $\theta$ is the incident angle of a light beam. Additionally, or alternatively, the optical filter 104 may include, for example, a spectral filter, a multispectral filter, a bandpass filter, a blocking filter, a long-wave pass filter, a short-wave pass filter, a dichroic filter, a linear variable filter (LVF), a circular variable filter (CVF), a Fabry-Perot filter (e.g., a Fabry-Perot cavity filter), a Bayer filter, a plasmonic filter, a photonic crystal filter, a nanostructure and/or metamaterial filter, an absorbent filter (e.g., comprising organic dyes, polymers, and/or glasses, among other examples), and/or the like.

As further shown in FIG. 1A, the optical sensor 106 may include one or more sensor elements 114 (e.g., an array of sensor elements, also referred to herein as a sensor array), each configured to obtain information. For example, a sensor element 114 may provide an indication of intensity of light that is incident on the sensor element 114 (e.g., active/inactive or a more granular indication of intensity). The optical sensor 106 may be configured to collect the information obtained by the one or more sensor elements 114 to generate sensor data.

The light source 108 may include a device capable of generating light (e.g., for illuminating the subject 116 described herein). For example, the light source 108 may include a light emitting diode (LED), such as a phosphor LED. In some implementations, the light source 108 may include a plurality of LEDs. In such a case, a first LED, of the plurality of LEDs, may be associated with a different spectral range than a second LED of the plurality of LEDs. This may enable the addressing of narrow spectral ranges using a plurality of LEDs, rather than addressing a wide spectral range using a single LED. In some implementations, the light source 108 may include a single modulated LED or a plurality of modulated LEDs. When the light source 108 includes one or more modulated LEDs, the optical sensor device may modulate a power supply of the light source 108. Using a modulated LED may enable driving the LED to a higher power than a continuous-wave LED. Furthermore, modulation may improve signal-to-noise properties of sensing performed using light from the modulated LED.

Figure 1B:
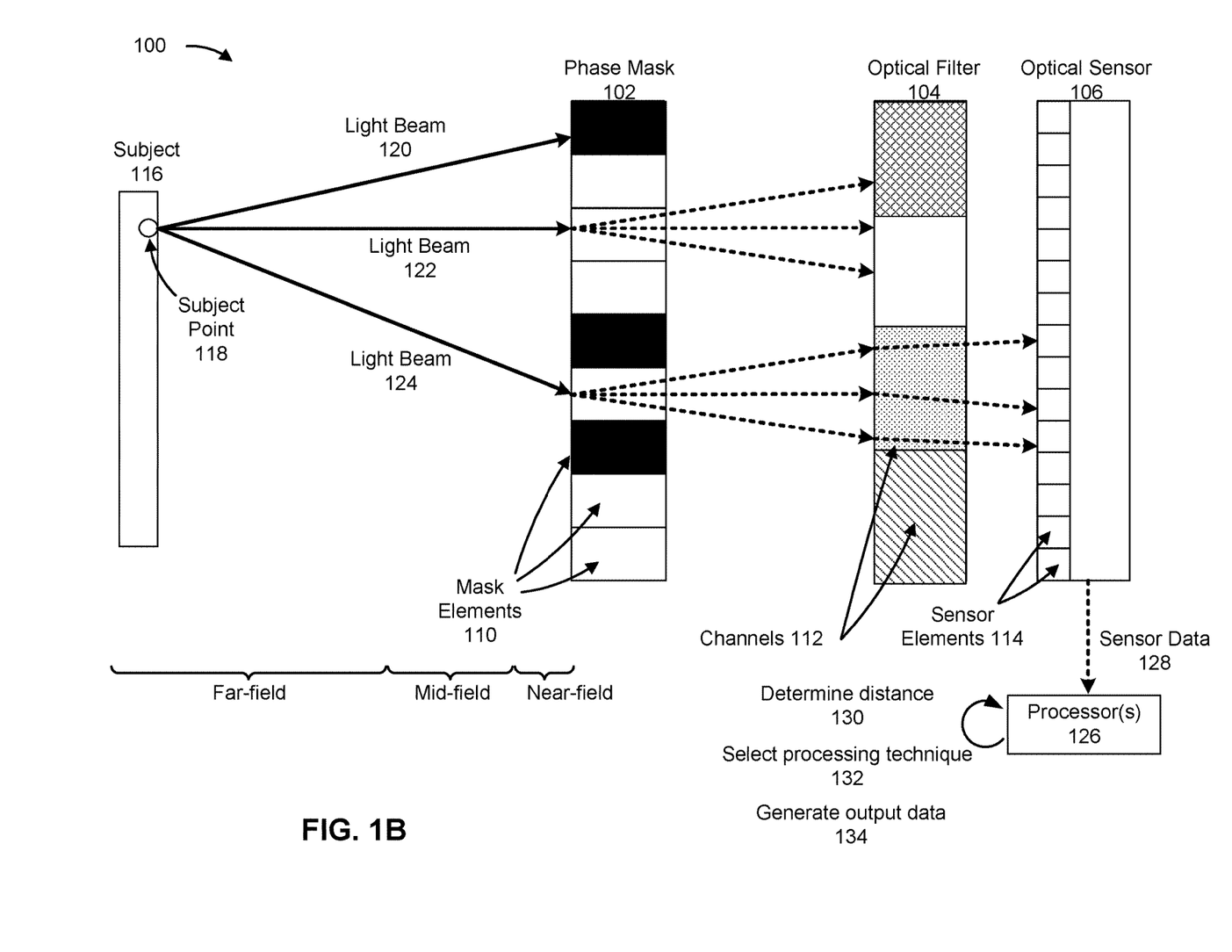

Turning to FIG. 1B, the optical sensor device associated with the phase mask 102, the optical filter 104, the optical sensor 106, and/or the light source 108 may be configured to capture information relating to a subject 116. The subject 116 may be in a "far-field," a "mid-field," or a "near-field" of the optical sensor device. For example, as shown in FIG. 1B, the subject 116 may be in the far-field when the subject 116 is a distance from the optical sensor device (e.g., from the phase mask 102, the optical filter 104, or the optical sensor 106) such that the distance satisfies (e.g., is greater than or equal to) a far-field distance threshold (e.g., 5 millimeters (mm)). The subject 116 may be in the mid-field when the distance satisfies (e.g., is greater than or equal to) a mid-field distance threshold (e.g., 1 mm) and the distance does not satisfy the far-field distance threshold (e.g., the distance is greater than or equal to 1 mm but less than 5 mm). The subject 116 may be in the near-field when the distance does not satisfy the mid-field distance threshold (e.g., the distance is less than 1 mm).

In some implementations, light from the light source 108 and/or ambient light may illuminate the subject 116. One or more light beams associated with a subject point 118 of the subject 116 (e.g., light beams of the light reflected by the subject point 118) may be received by the optical sensor device. For example, as shown in FIG. 1B, a light beam 120, a light beam 122, and a light beam 124 may originate at the subject point 118. The light beam 120 may be blocked by an opaque mask element 110 of the phase mask 102. The light beam 122 and the light beam 124 may each pass through the phase mask 102 via respective transparent mask elements 110. As further shown in FIG. 1B, the light beam 122 and the light beam 124 may be diffused by the respective transparent mask elements 110 when passing through the phase mask 102. Accordingly, the phase mask 102 may distribute the light beam 122 and the light beam 124 in an encoded pattern on the input surface of the optical filter 104 (e.g., where respective sub-beams of the light beam 122 and the light beam 124 are distributed across the input surface of the optical filter 104).

In some implementations, a channel 112 of the optical filter 104 may receive a light beam, or a sub-beam of a light beam, but may not pass the light beam or sub-beam to the optical sensor 106. For example, as shown in FIG. 1B, a channel 112 of the optical filter 104 may receive one or more sub-beams of the light beam 122, but may not pass the one or more sub-beams to the optical sensor 106 because the one or more sub-beams are not associated with one or more wavelength ranges that the channel 112 is configured to pass. In some implementations, a channel 112 of the optical filter 104 may receive a light beam or a sub-beam of the light beam and may pass the light beam or sub-beam to a corresponding sensor element 114 of the optical sensor 106. For example, as shown in FIG. 1B, a channel 112 of the optical filter 104 may receive one or more sub-beams of the light beam 124 and may pass the one or more sub-beams to one or more corresponding sensor elements 114 of the optical sensor 106 because the one or more sub-beams are associated with one or more wavelength ranges that the channel 112 is configured to pass.

As further shown in FIG. 1B, the optical sensor device may be associated with one or more processors 126 and may provide, as shown by reference number 128, sensor data to the one or more processors 126. The sensor data may indicate information relating to the light beams originating at the subject 116 and/or the subject point 118, such as an indication of intensity of the light beams (and/or sub-beams of the light beams) that are received by the one or more sensor elements 114.

As further shown in FIG. 1B, and by reference number 130, the one or more processors 126 may determine a distance of the subject 116 from the optical sensor device (e.g., from the phase mask 102, the optical filter 104, or the optical sensor 106). For example, the one or more processors 126 may cause a proximity sensor (e.g., a time-of-flight sensor) associated with the optical sensor device to collect proximity data concerning the subject 116. The proximity sensor may collect the proximity data (e.g., that indicates a distance from the proximity sensor to the subject 116) and may provide the proximity data to the one or more processors 126. The one or more processors 126 may process the proximity data (e.g., using an algorithm) to determine the distance of the subject 116 from the optical sensor device.

As another example, the one or more processors 126 may identify, based on the sensor data, a first sensor element 114 of the optical sensor 106 that received a first light beam (e.g., that originated at the subject point 118) and a second sensor element 114 of the optical sensor 106 that received a second light beam (e.g., that originated at the subject point 118). The one or more processors 126 may determine, based on information associated with the optical filter 104 (e.g., that indicates a correspondence between channels 112 of the optical filter 104 and sensor elements 114 of the optical sensor 106), a first channel 112 as having received and passed the first light beam to the first sensor element 114 and a second channel 112 as having received and passed the second light beam to the second sensor element 114.

The one or more processors 126 may determine, based on information associated with the encoded pattern, an angle of incidence of the first light beam on the first channel 112 and an angle of incidence of the second light beam on the second channel 112. The information associated with the encoded pattern may include information for determining the angle of incidence of a particular light beam on a particular channel 112 of the optical filter 104. For example, the information associated with the encoded pattern may identify at least one algorithm, such as a computational encoding algorithm that causes the phase mask 102 to distribute light beams in the encoded pattern on the input surface of the optical filter 104 and/or an algorithm for reconstructing an image from the encoded pattern, among other examples. Accordingly, the one or more processors 126 may process, using the at least one algorithm identified by the information associated with the encoded pattern, information identifying the first channel 112 and/or the first sensor element 114, and information identifying the second channel 112 and/or the second sensor element 114, to determine the angle of incidence of the first light beam on the first channel 112 and the angle of incidence of the second light beam on the second channel 112.

In some implementations, the one or more processors 126 may determine, based on the angle of incidence of the first light beam on the first channel 112 and the angle of incidence of the second light beam on the second channel 112, the distance of the subject point 116 from the optical sensor device (e.g., from the phase mask 102, the optical filter 104, or the optical sensor 106). For example, the one or more processors 126 may use a computer vision technique (e.g., a triangulation computation technique, a stereo vision technique, and/or the like) based on information indicating a location of the first channel 112 and the angle of incidence of the first light beam on the first channel 112, and information indicating a location of the second channel 112 and the angle of incidence of the second light beam on the second channel 112, to determine a distance to the subject point 116.

As further shown in FIG. 1B, and by reference number 132, the one or more processors 126 may select a processing technique to process the sensor data. For example, the one or more processors 126 may select an imaging processing technique or a spectroscopic processing technique. For example, the one or more processors 126 may determine whether the distance of the subject 116 from the optical sensor device (e.g., from the phase mask 102, the optical filter 104, or the optical sensor 106) satisfies (e.g., is greater than or equal to) a far-field distance threshold (e.g., 5 mm) and may select the imaging processing technique based on determining that the distance satisfies the far-field distance threshold. The one or more processors 126 may select a spectroscopic technique based on determining that the distance does not satisfy the far-field distance threshold. For example, the one or more processors 126 may determine, after determining that the distance does not satisfy the far-field distance threshold, whether the distance satisfies (e.g., is great than or equal to) a mid-field distance threshold, and may select a first spectroscopic processing technique (e.g., a spectroscopic processing technique that is optimized to determine spectral information associated with a subject in the mid-field range) based on determining that the distance satisfies the mid-field distance threshold. When the one or more processors 126 determine that the distance does not satisfy the mid-field distance threshold, the one or more processors 126 may select a second spectroscopic processing technique (e.g., a spectroscopic processing technique that is optimized to determine spectral information associated with a subject in the near-field range).

In another example, the one or more processors 126 may cause a display of another device, such as a user device (e.g., as described herein in relation to FIG. 2), associated with the optical sensor device to display a message. The message may instruct a user of the optical sensor device and/or the other device to choose a processing technique to process the sensor data. For example, the message may instruct the user to choose an image processing technique or a spectroscopic processing technique. The user may interact with a user interface of the other device to provide input data that indicates a choice of the user (e.g., a choice of an image processing technique or a spectroscopic processing technique). The other device may provide the input data to the one or more processors 126. After receiving the input data, the one or more processors may select a processing technique to process the sensor data based on the input data (e.g., select the processing technique indicated by the input data).

As further shown in FIG. 1B, and by reference number 134, the one or more processors 126 may process the sensor data using the selected processing technique to generate output data. For example, when the selected processing technique is an imaging processing technique, the one or more processors 126 may identify an algorithm for reconstructing an image from the encoded pattern and may process the sensor data using the algorithm to generate an image of the subject 116. As another example, when the selected processing technique is a spectroscopic processing technique, the one or more processors 126 may identify an algorithm for analyzing spectral data and may process the sensor data using the algorithm to generate spectral information concerning the subject 116. In some implementations, when using a spectroscopic processing technique, the one or more processors 126 may identify a classification of the subject 116 (e.g., when the subject 116 is a food item, classify the food item as fresh or spoiled), a material composition of the subject 116 (e.g., when the subject 116 is an object, identify one or more materials that comprise the object), or a health-related measurement of the subject 116 (e.g., when the subject 116 is biological tissue, such as biological tissue of a finger, identify a pulse, a blood pressure, a glucose level, a hydration level, and/or the like associated with the subject 116), among other examples.

In some implementations, the one or more processors 126 may provide the output data to another device, such as a user device. For example, the one or more processors 126 may send the output data to the user device to cause the user device to display the output data on a display of the user device. As another example, the one or more processors 126 may send the output data to the user device to cause the user device to determine one or more characteristics of the subject 116 (e.g., the classification of the subject 116, the material composition of the subject 116, the health-related measurement of the subject 116, and/or the like).

As indicated above, FIGS. 1A and 1B are provided as one or more examples. Other examples may differ from what is described with regard to FIGS. 1A and 1B.

Figure 2:
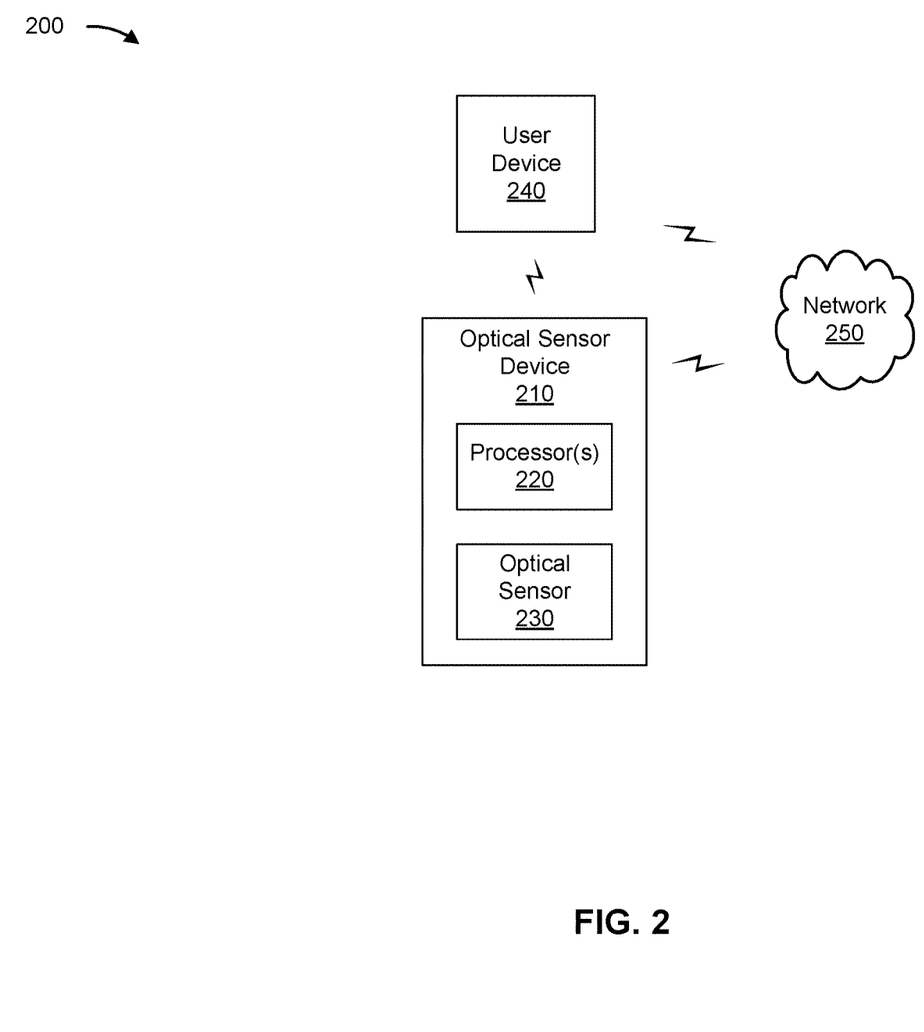
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an optical sensor device 210 that may include one or more processors 220 (e.g., that correspond to the one or more processors 126 described herein in relation to FIGS. 1A and 1B) and an optical sensor 230 (e.g., that corresponds to the optical sensor 106 described herein in relation to FIGS. 1A and 1B). The environment 200 may also include a user device 240 and a network 250. Devices of environment 200 may interconnect via wired connections, wireless connections, or a combination of wired and wireless connections.

Optical sensor device 210 may include an optical device capable of storing, processing, and/or routing image information and/or spectral information associated with a subject. For example, optical sensor device 210 may include a computational camera device that captures an image of the subject (e.g., using a computational encoding algorithm). As another example, optical sensor device 210 may include a spectrometer device that performs spectroscopy, such as a spectral optical sensor device (e.g., a binary multispectral optical sensor device that performs vibrational spectroscopy (such as a near infrared (NIR) spectrometer), a mid-infrared spectroscopy (mid-IR), Raman spectroscopy, and/or the like). In another example, optical sensor device 210 may perform a health parameter monitoring determination, a pulse transit time determination, a biometric authentication determination, a liveness detection determination, and/or the like. In this case, optical sensor device 210 may utilize the same wavelengths, different wavelengths, a combination of the same wavelengths and different wavelengths, and/or the like for such determinations. In some implementations, optical sensor device 210 may be incorporated into a user device 240, such as a wearable spectrometer and/or the like. In some implementations, optical sensor device 210 may receive information from and/or transmit information to another device in environment 200, such as user device 240.

In some implementations, optical sensor device 210 may comprise a spectral imaging camera. A spectral imaging camera is a device that can capture an image of a scene. A spectral imaging camera (or a processor 220 associated with the spectral imaging camera) may be capable of determining spectral content or changes in spectral content at different points in an image of a scene, such as any point in an image of a scene. In some implementations, optical sensor device 210 may comprise a spectral imaging camera capable of performing hyperspectral imaging. For example, optical sensor device 210 may include an optical filter (e.g., optical filter 104, described herein in relation to FIGS. 1A and 1B). In some implementations, the optical filter may be disposed on optical sensor 230. In some implementations, optical sensor device 210 may comprise a phase mask (e.g., phase mask 102, described herein in relation to FIGS. 1A and 1B). For example, the phase mask may be configured to distribute light in an encoded pattern across an input surface of the optical filter when the light is en route to optical sensor 230. Each point in an image captured by optical sensor device 210 may be encoded with spatio-spectral information by the phase mask.

Optical sensor device 210 may include one or more processors 220, described in more detail in connection with FIG. 3.

Optical sensor device 210 may include an optical sensor 230. Optical sensor 230 includes a device capable of sensing light. For example, optical sensor 230 may include an image sensor, a multispectral sensor, a spectral sensor, and/or the like. In some implementations, optical sensor 230 may include a silicon (Si) based sensor, an indium-gallium-arsenide (InGaAs) based sensor, a lead-sulfide (PbS) based sensor, or a germanium (Ge) based sensor, may utilize one or more sensor technologies, such as a complementary metal-oxide-semiconductor (CMOS) technology, or a charge-coupled device (CCD) technology, among other examples. In some implementations, optical sensor 230 may include a front-side illumination (FSI) sensor, a back-side illumination (BSI) sensor, and/or the like. In some implementations, optical sensor 230 may be included in a camera of optical sensor device 210 and/or user device 240.

User device 240 includes one or more devices capable of receiving, generating, storing, processing, and/or providing the imaging information and/or the spectral information associated with the subject. For example, user device 240 may include a communication and/or computing device, such as a mobile phone (e.g., a smart phone, a radiotelephone, and/or the like), a computer (e.g., a laptop computer, a tablet computer, a handheld computer, and/or the like), a gaming device, a wearable communication device (e.g., a smart wristwatch, a pair of smart eyeglasses, and/or the like), or a similar type of device. In some implementations, user device 240 may receive information from and/or transmit information to another device in environment 200, such as optical sensor device 210.

Network 250 includes one or more wired and/or wireless networks. For example, network 250 may include a cellular network (e.g., a long-term evolution (LTE) network, a code division multiple access (CDMA) network, a 2G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, although optical sensor device 210 and user device 240 are described as separate devices, optical sensor device 210 and user device 240 may be implemented as a single device. Additionally, or alternatively, a set of devices (e.g., one or more devices) of environment 200 may perform one or more functions described as being performed by another set of devices of environment 200.

Figure 3:
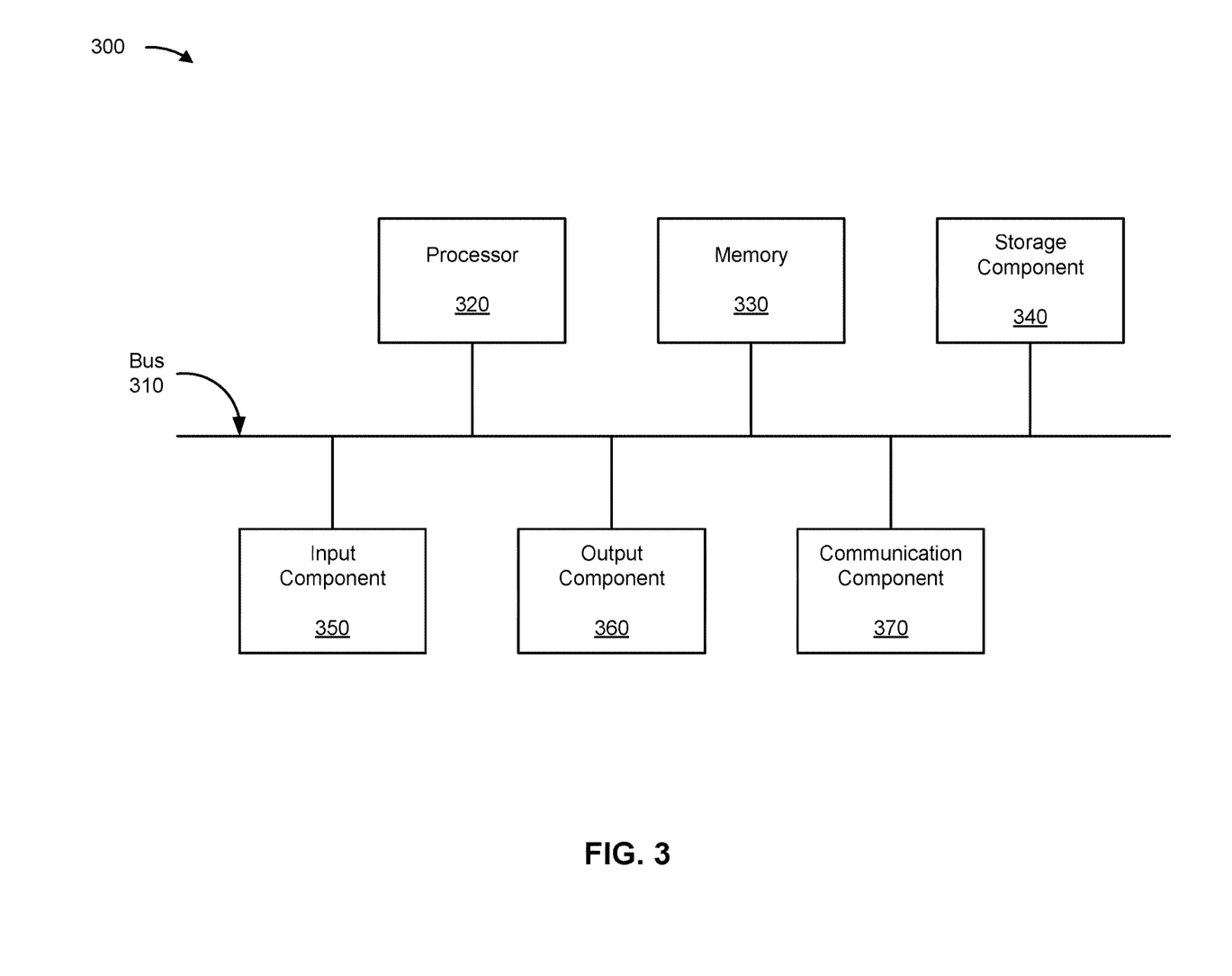
FIG. 3 is a diagram of example components of one or more devices of FIG. 2.

FIG. 3 is a diagram of example components of a device 300, which may correspond to optical sensor device 210 and/or user device 240. In some implementations, optical sensor device 210 and/or user device 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
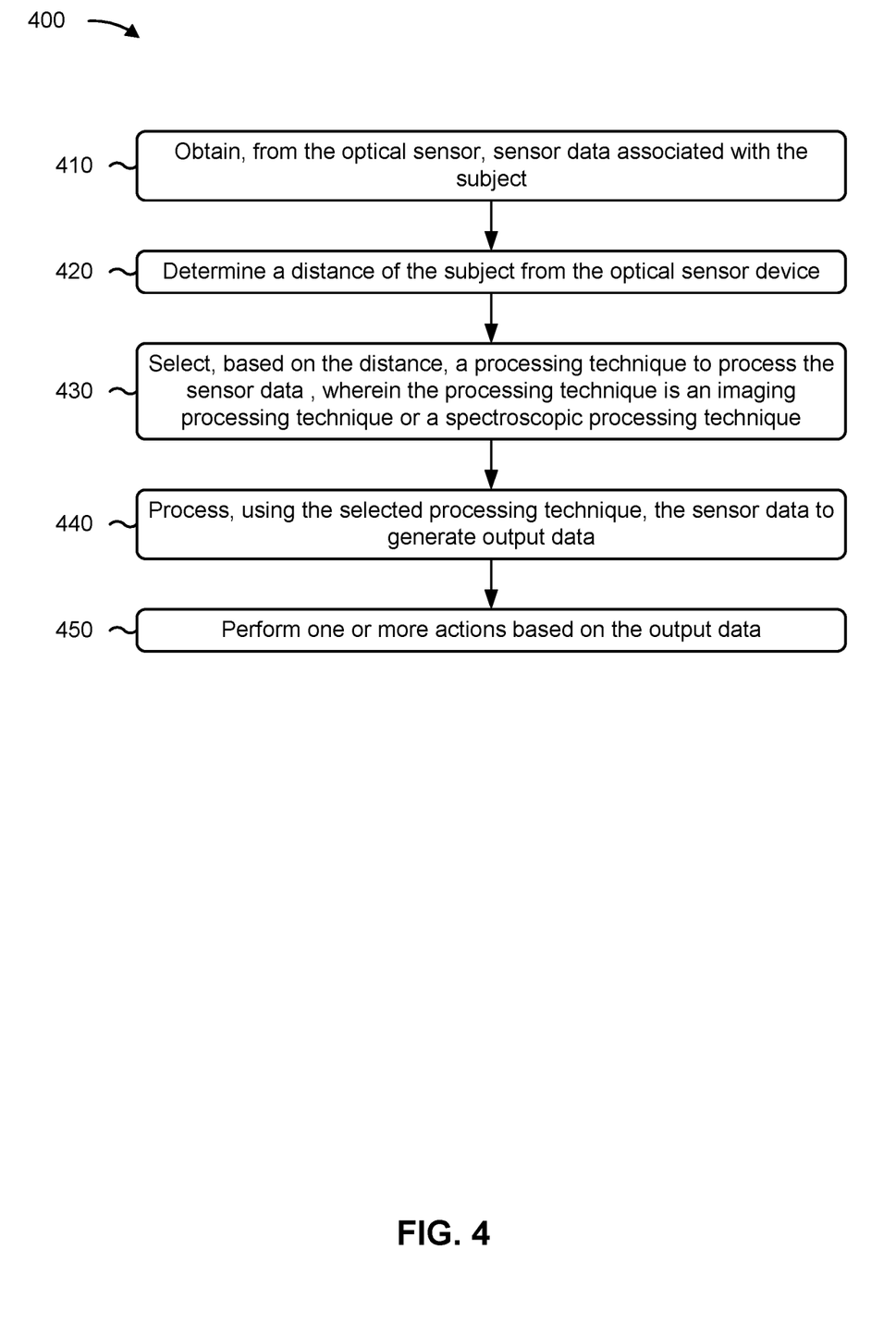
FIGS. 4-6 are flowcharts of example processes relating to an optical sensor device.

FIG. 4 is a flowchart of an example process 400 associated with an optical sensor device (e.g., optical sensor device 210). In some implementations, one or more process blocks of FIG. 4 may be performed by one or more processors (e.g., one or more processors 126 or one or more processors 220) of the optical sensor device. In some implementations, one or more process blocks of FIG. 4 may be performed by another device or a group of devices separate from or including the one or more processors, such as a user device (e.g., user device 240). Additionally, or alternatively, one or more process blocks of FIG. 4 may be performed by one or more components of device 300, such as processor 320, memory 330, storage component 340, input component 350, output component 360, and/or communication component 370.

In some implementations, the optical sensor device may include, in addition to the one or more processors, an optical sensor including a set of sensor elements; an optical filter including one or more channels; and a phase mask configured to distribute a plurality of light beams associated with a subject in an encoded pattern on an input surface of the optical filter.

As shown in FIG. 4, process 400 may include obtaining, from the optical sensor, sensor data associated with the subject (block 410). For example, the one or more processors may obtain, from the optical sensor, sensor data associated with the subject, as described above.

As further shown in FIG. 4, process 400 may include determining a distance of the subject from the optical sensor device (block 420). For example, the one or more processors may determine a distance of the subject from the optical sensor device, as described above.

As further shown in FIG. 4, process 400 may include selecting, based on the distance, a processing technique to process the sensor data, wherein the processing technique is an imaging processing technique or a spectroscopic processing technique (block 430). For example, the one or more processors may select, based on the distance, a processing technique to process the sensor data, as described above. In some implementations, the processing technique is an imaging processing technique or a spectroscopic processing technique.

As further shown in FIG. 4, process 400 may include processing, using the selected processing technique, the sensor data to generate output data (block 440). For example, the one or more processors may process, using the selected processing technique, the sensor data to generate output data, as described above.

As further shown in FIG. 4, process 400 may include performing one or more actions based on the output data (block 450). For example, the one or more processors may perform one or more actions based on the output data, as described above.

Process 400 may include additional implementations, such as any single implementation or any combination of implementations described below and/or in connection with one or more other processes described elsewhere herein.

In a first implementation, determining the distance of the subject from the optical sensor device includes obtaining, from a proximity sensor associated with the optical sensor device, proximity data, and determining the distance based on the proximity data.

In a second implementation, the optical filter has an angle-dependent wavelength characteristic and determining the distance of the subject from the optical sensor device includes processing the sensor data, based on information associated with the encoded pattern, to identify respective angles of incidence on the optical filter of a set of light beams, of the plurality of light beams, that are associated with a point of the subject, and determining, based on identifying the respective angles of incidence on the optical filter of the set of light beams, the distance of the subject from the optical sensor device.

In a third implementation, the information associated with the encoded pattern includes, for a light beam, of the plurality of light beams, that is distributed by the phase mask in the encoded pattern, information for determining, when the light beam falls incident on a particular channel, of the one or more channels, of the optical filter, an angle of incidence of the light beam on the particular channel.

In a fourth implementation, selecting the processing technique to process the sensor data includes determining whether the distance satisfies a distance threshold, and selecting the imaging processing technique based on determining that the distance satisfies the distance threshold, or the spectroscopic processing technique based on determining that the distance does not satisfy the distance threshold.

In a fifth implementation, the selected processing technique is the imaging processing technique, and processing the sensor data to generate the output data includes identifying, based on information associated with the encoded pattern, an algorithm for reconstructing an image from the encoded pattern, and processing the sensor data using the algorithm to generate the output data, wherein the output data comprises an image of the subject.

In a sixth implementation, the selected processing technique is the spectroscopic processing technique and the output data indicates a classification of the subject, a material composition of the subject, or a health-related measurement of the subject.

In a seventh implementation, performing the one or more actions includes causing display of the output data on a display of another device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
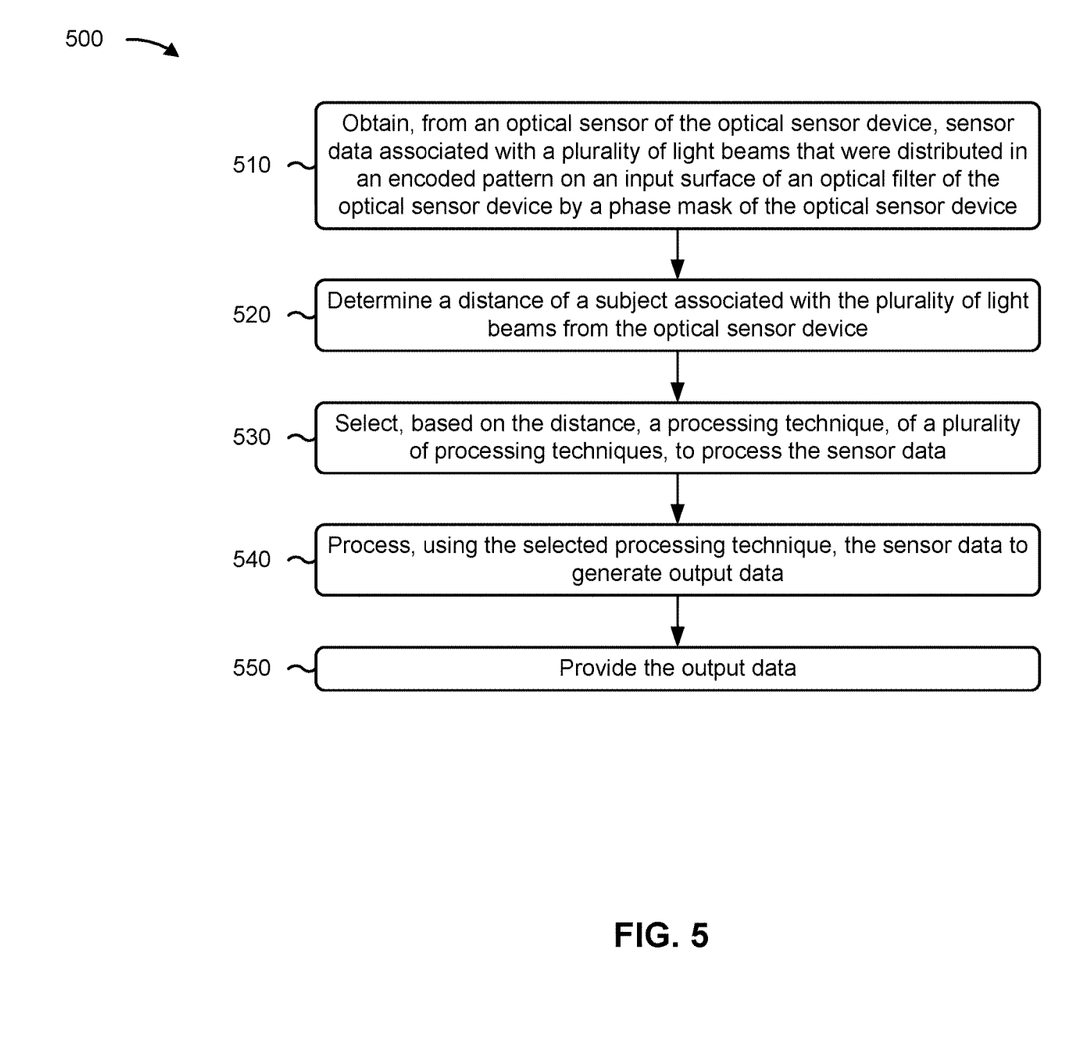

FIG. 5 is a flowchart of an example process 500 associated with an optical sensor device (e.g., optical sensor device 210). In some implementations, one or more process blocks of FIG. 5 may be performed by one or more processors (e.g., one or more processors 126 or one or more processors 220) of the optical sensor device. In some implementations, one or more process blocks of FIG. 5 may be performed by another device or a group of devices separate from or including the one or more processors, such as a user device (e.g., user device 240). Additionally, or alternatively, one or more process blocks of FIG. 5 may be performed by one or more components of device 300, such as processor 320, memory 330, storage component 340, input component 350, output component 360, and/or communication component 370.

As shown in FIG. 5, process 500 may include obtaining, from an optical sensor of the optical sensor device, sensor data associated with a plurality of light beams that were distributed in an encoded pattern on an input surface of an optical filter of the optical sensor device by a phase mask of the optical sensor device (block 510). For example, the one or more processors may obtain, from an optical sensor of the optical sensor device, sensor data associated with a plurality of light beams that were distributed in an encoded pattern on an input surface of an optical filter of the optical sensor device by a phase mask of the optical sensor device, as described above.

As further shown in FIG. 5, process 500 may include determining a distance of a subject associated with the plurality of light beams from the optical sensor device (block 520). For example, the one or more processors may determine a distance of a subject associated with the plurality of light beams from the optical sensor device, as described above.

As further shown in FIG. 5, process 500 may include selecting, based on the distance, a processing technique, of a plurality of processing techniques, to process the sensor data (block 530). For example, the one or more processors may select, based on the distance, a processing technique, of a plurality of processing techniques, to process the sensor data, as described above.

As further shown in FIG. 5, process 500 may include processing, using the selected processing technique, the sensor data to generate output data (block 540). For example, the one or more processors may process, using the selected processing technique, the sensor data to generate output data, as described above.

As further shown in FIG. 5, process 500 may include providing the output data (block 550). For example, the one or more processors may provide the output data, as described above.

Process 500 may include additional implementations, such as any single implementation or any combination of implementations described below and/or in connection with one or more other processes described elsewhere herein.

In a first implementation, the plurality of processing techniques includes a far-field processing technique, a mid-field processing technique, and a near-field processing technique, wherein selecting the processing technique, of the plurality of processing techniques, to process the sensor data includes selecting the far-field processing technique when the distance satisfies a first distance threshold, selecting the mid-field processing technique when the distance does not satisfy the first distance threshold and satisfies a second distance threshold, or selecting the near-field processing technique when the distance does not satisfy the second distance threshold.

In a second implementation, the selected processing technique is a far-field processing technique, and processing the sensor data to generate the output data includes processing, using the far-field processing technique, the sensor data to generate an image of the subject.

In a third implementation, the selected processing technique is a mid-field processing technique, and processing the sensor data to generate the output data includes processing, using the mid-field processing technique, the sensor data to determine at least one of a classification of the subject or a material composition of the subject.

In a fourth implementation, the selected processing technique is a near-field processing technique, and processing the sensor data to generate the output data includes processing, using the near-field processing technique, the sensor data to determine a health-related measurement of the subject.

In a fifth implementation, providing the output data includes sending the output data to another device to cause the other device to determine one or more characteristics of the subject.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
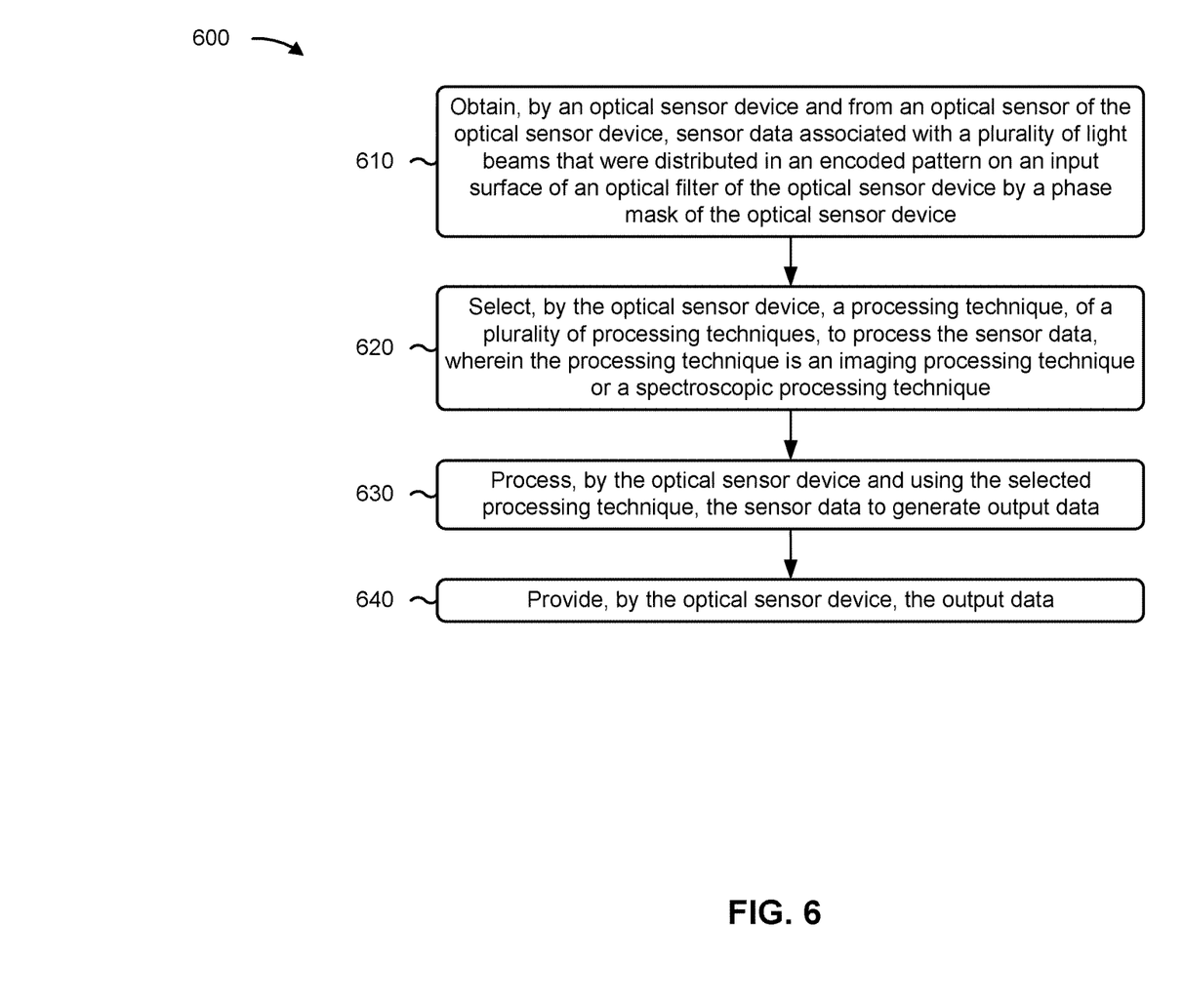

FIG. 6 is a flowchart of an example process 600 associated with an optical sensor device. In some implementations, one or more process blocks of FIG. 6 may be performed by an optical sensor device (e.g., optical sensor device 210). In some implementations, one or more process blocks of FIG. 6 may be performed by another device or a group of devices separate from or including the optical sensor device, such as a user device (e.g., user device 240). Additionally, or alternatively, one or more process blocks of FIG. 6 may be performed by one or more components of device 300, such as processor 320, memory 330, storage component 340, input component 350, output component 360, and/or communication component 370.

As shown in FIG. 6, process 600 may include obtaining, from an optical sensor of the optical sensor device, sensor data associated with a plurality of light beams that were distributed in an encoded pattern on an input surface of an optical filter of the optical sensor device by a phase mask of the optical sensor device (block 610). For example, the optical sensor device may obtain, from an optical sensor of the optical sensor device, sensor data associated with a plurality of light beams that were distributed in an encoded pattern on an input surface of an optical filter of the optical sensor device by a phase mask of the optical sensor device, as described above.

As further shown in FIG. 6, process 600 may include selecting a processing technique, of a plurality of processing techniques, to process the sensor data, wherein the processing technique is an imaging processing technique or a spectroscopic processing technique (block 620). For example, the optical sensor device may select a processing technique, of a plurality of processing techniques, to process the sensor data, as described above. In some implementations, the processing technique is an imaging processing technique or a spectroscopic processing technique.

As further shown in FIG. 6, process 600 may include processing, using the selected processing technique, the sensor data to generate output data (block 630). For example, the optical sensor device may process, using the selected processing technique, the sensor data to generate output data, as described above.

As further shown in FIG. 6, process 600 may include providing the output data (block 640). For example, the optical sensor device may provide the output data, as described above.

Process 600 may include additional implementations, such as any single implementation or any combination of implementations described below and/or in connection with one or more other processes described elsewhere herein.

In a first implementation, selecting the processing technique comprises causing a display associated with the optical sensor device to display a message instructing a user of the optical sensor device to choose the imaging processing technique or the spectroscopic processing technique, receiving, after causing display of the message, input data indicating a choice of the user, and selecting, based on the input data, the imaging processing technique or the spectroscopic processing technique.

In a second implementation, selecting the processing technique comprises determining a distance of a subject associated with the plurality of light beams from the optical sensor device, and automatically selecting, based on the distance, the imaging processing technique or the spectroscopic processing technique.

In a third implementation, the selected processing technique is the imaging processing technique and the output data is an image of a subject associated with the plurality of light beams.

In a fourth implementation, the selected processing technique is the spectroscopic processing technique and the output data indicates a classification of a subject associated with the plurality of light beams, a material composition of the subject, or a health-related measurement of the subject.

In a fifth implementation, providing the output data comprises sending the output data to another device to cause the other device to display the output data on a display of the other device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical sensor device, comprising:
an optical sensor including a set of sensor elements;
an optical filter including one or more channels;
a phase mask configured to distribute a plurality of light beams associated with a subject in an encoded pattern on an input surface of the optical filter; and
one or more processors configured to:
obtain, from the optical sensor, sensor data associated with the subject;
determine a distance of the subject from the optical sensor device;
select, based on the distance, a processing technique to process the sensor data,
wherein the processing technique is one of:
an imaging processing technique for generating an image of at least a portion of the subject, wherein the subject is a human body, or
a spectroscopic processing technique;
process, using the selected processing technique, the sensor data to generate output data; and
perform one or more actions based on the output data.

2. The optical sensor device of claim 1, wherein the one or more processors are configured to, when determining the distance of the subject from the optical sensor device:
obtain, from a proximity sensor associated with the optical sensor device, proximity data; and
determine the distance based on the proximity data.

3. The optical sensor device of claim 1, wherein the optical filter has an angle-dependent wavelength characteristic, and
wherein the one or more processors are configured to, when determining the distance of the subject from the optical sensor device:
process the sensor data, based on information associated with the encoded pattern, to identify respective angles of incidence on the optical filter of a set of light beams, of the plurality of light beams, that are associated with a point of the subject; and
determine, based on identifying the respective angles of incidence on the optical filter of the set of light beams, the distance of the subject from the optical sensor device.

4. The optical sensor device of claim 3, wherein the information associated with the encoded pattern includes, for a light beam, of the plurality of light beams, that is distributed by the phase mask in the encoded pattern:
information for determining, when the light beam falls incident on a particular channel, of the one or more channels, of the optical filter, an angle of incidence of the light beam on the particular channel.

5. The optical sensor device of claim 1, wherein the one or more processors are configured to, when selecting the processing technique to process the sensor data:
determine whether the distance satisfies a distance threshold; and
selecting:
the imaging processing technique based on determining that the distance satisfies the distance threshold; or
the spectroscopic processing technique based on determining that the distance does not satisfy the distance threshold.

6. The optical sensor device of claim 1, wherein the selected processing technique is the imaging processing technique, and
wherein the one or more processors are configured to, when processing the sensor data to generate the output data:
identify, based on information associated with the encoded pattern, an algorithm for reconstructing an image from the encoded pattern; and
process the sensor data using the algorithm to generate the output data,
wherein the output data comprises the image of at least the portion of the subject.

7. The optical sensor device of claim 1, wherein the selected processing technique is the spectroscopic processing technique and the output data indicates:
a classification of the subject;
a material composition of the subject; or
a health-related measurement of the subject.

8. The optical sensor device of claim 1, wherein the one or more processors are configured to, when performing the one or more actions:
cause display of the output data on a display of another device.

9. A non-transitory computer-readable medium storing instructions, the instructions comprising:
one or more instructions that, when executed by one or more processors of an optical sensor device, cause the one or more processors to:
obtain, from an optical sensor of the optical sensor device, sensor data associated with a plurality of light beams that were distributed in an encoded pattern on an input surface of an optical filter of the optical sensor device by a phase mask of the optical sensor device;
determine a distance of a subject associated with the plurality of light beams from the optical sensor device;
select, based on the distance, a processing technique, of a plurality of processing techniques, to process the sensor data,
wherein the processing technique is one of:
an imaging processing technique for generating an image of at least a portion of the subject, wherein the subject is a human body, or
a spectroscopic processing technique;
process, using the selected processing technique, the sensor data to generate output data; and
provide the output data.

10. The non-transitory computer-readable medium of claim 9, wherein the plurality of processing techniques includes a far-field processing technique, a mid-field processing technique, and a near-field processing technique, and
wherein the one or more instructions, that cause the optical sensor device to select the processing technique, of the plurality of processing techniques, to process the sensor data, cause the optical sensor device to:
select the far-field processing technique when the distance satisfies a first distance threshold;
select the mid-field processing technique when the distance does not satisfy the first distance threshold and satisfies a second distance threshold; or
select the near-field processing technique when the distance does not satisfy the second distance threshold.

11. The non-transitory computer-readable medium of claim 9,
wherein the selected processing technique is a far-field processing technique,
wherein the far-field processing technique is the imaging processing technique, and
wherein the one or more instructions, that cause the optical sensor device to process the sensor data to generate the output data, cause the optical sensor device to:
process, using the far-field processing technique, the sensor data to generate the image of at least the portion of the subject.

12. The non-transitory computer-readable medium of claim 9,
wherein the selected processing technique is a mid-field processing technique,
wherein the mid-field processing technique is the spectroscopic processing technique, and
wherein the one or more instructions, that cause the optical sensor device to process the sensor data to generate the output data, cause the optical sensor device to:
process, using the mid-field processing technique, the sensor data to determine at least one of:
a classification of the subject; or
a material composition of the subject.

13. The non-transitory computer-readable medium of claim 9,
wherein the selected processing technique is a near-field processing technique,
wherein the near-field processing technique is the spectroscopic processing technique, and wherein the one or more instructions, that cause the optical sensor device to process the sensor data to generate the output data, cause the optical sensor device to:
  process, using the near-field processing technique, the sensor data to determine a health-related measurement of the subject.

14. The non-transitory computer-readable medium of claim 9, wherein the one or more instructions, that cause the optical sensor device to provide the output data, cause the optical sensor device to:
  send the output data to another device to cause the other device to determine one or more characteristics of the subject.

15. A method, comprising:
  obtaining, by an optical sensor device and from an optical sensor of the optical sensor device, sensor data associated with a plurality of light beams that were distributed in an encoded pattern on an input surface of an optical filter of the optical sensor device by a phase mask of the optical sensor device;
  selecting, by the optical sensor device, a processing technique, of a plurality of processing techniques, to process the sensor data,
    wherein the processing technique is one of:
      an imaging processing technique for generating an image of at least a portion of a human body, or
      a spectroscopic processing technique;
  processing, by the optical sensor device and using the selected processing technique, the sensor data to generate output data; and
  providing, by the optical sensor device, the output data.

16. The method of claim 15, wherein selecting the processing technique comprises:
  causing a display associated with the optical sensor device to display a message instructing a user of the optical sensor device to choose the imaging processing technique or the spectroscopic processing technique;
  receiving, after causing display of the message, input data indicating a choice of the user; and
  selecting, based on the input data, the imaging processing technique or the spectroscopic processing technique.

17. The method of claim 15, wherein selecting the processing technique comprises:
  determining a distance of the human body from the optical sensor device; and
  automatically selecting, based on the distance, the imaging processing technique or the spectroscopic processing technique.

18. The method of claim 15, wherein the selected processing technique is the imaging processing technique and the output data is the image of at least the portion of the human body.

19. The method of claim 15, wherein the selected processing technique is the spectroscopic processing technique and the output data indicates:
  a classification of the human body;
  a material composition of the human body; or
  a health-related measurement of the subject human body.

20. The method of claim 15, wherein providing the output data comprises:
  sending the output data to another device to cause the other device to display the output data on a display of the other device.

* * * * *

UNITED STATES PATENT AND TRADEMARK OFFICE
CERTIFICATE OF CORRECTION

PATENT NO. : 11,530,951 B2
APPLICATION NO. : 17/139504
DATED : December 20, 2022
INVENTOR(S) : William D. Houck It is certified that error appears in the above-identified patent and that said Letters Patent is hereby corrected as shown below:

In the Claims

In Claim 19, Column 20, Line 27, "a health-related measurement of the subject human body." should be changed to --a health-related measurement of the human body.--.

Signed and Sealed this
Twenty-fourth Day of January, 2023

Katherine Kelly Vidal
*Director of the United States Patent and Trademark Office*